United States Patent
Chen et al.

(10) Patent No.: US 6,658,161 B1
(45) Date of Patent: Dec. 2, 2003

(54) SIGNAL-PROCESSING METHOD AND DEVICE THEREFORE

(75) Inventors: Oscal Tzyh-Chiang Chen, Taipei (TW); Hsun-Chang Hsieh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/557,214

(22) Filed: Apr. 25, 2000

(30) Foreign Application Priority Data

Sep. 3, 1999 (TW) ....................... 88115162 A

(51) Int. Cl.[7] ............................ G06K 9/36; H04N 9/47; H04N 7/12
(52) U.S. Cl. ................. 382/250; 382/251; 382/239; 382/236; 348/407.1; 348/103; 348/97
(58) Field of Search ................. 382/218, 219, 382/220, 221, 277, 278, 282, 287, 291, 293, 294, 295, 250, 251, 253, 236, 239; 358/448, 452, 453, 474; 348/403.1, 405.1, 408.1, 97, 103, 407.1, 413.1

(56) References Cited

U.S. PATENT DOCUMENTS

| | | | | |
|---|---|---|---|---|
| 5,760,836 A | * | 6/1998 | Greenfield et al. | ......... 348/419 |
| 6,041,162 A | * | 3/2000 | Choi | ........................ 386/124 |
| 6,275,527 B1 | * | 8/2001 | Bist et al. | .................. 375/240 |
| 6,404,813 B1 | * | 6/2002 | Haskell et al. | ......... 375/240.12 |
| 6,442,207 B1 | * | 8/2002 | Nishikawa et al. | .... 375/240.26 |

* cited by examiner

Primary Examiner—Bhavesh M. Mehta
Assistant Examiner—Yosef Kassa
(74) Attorney, Agent, or Firm—Rabin & Berdo, P.C.

(57) ABSTRACT

A signal-processing method for performing a coordinate transformation operation and a quantization operation on an input data to obtain quantization outputs, and a signal-processing device therefor. A search strategy based on the characteristic of the input data is established. By using the search strategy, the End of Block (EOB) is predicted and the calculation structure is determined by the predicted EOB.

21 Claims, 11 Drawing Sheets

SIGNAL-PROCESSING METHOD AND DEVICE THEREFORE

BACKGROUND OF THE INVENTION

This application incorporates by reference Taiwanese application Ser. No. 88115162, filed Sep. 3, 1999.

1. Field of the Invention

The invention relates in general to a signal-processing method and a device therefor which combine a coordinate transformation with quantization and more particularly to a signal-processing method and a device therefore for achieving adaptive calculation quantity, image quality and bit rate.

2. Description of the Related Art

In digital signal compression, in order to reduce redundant data in coding, the coordinate transformation is usually applied for compressing image data or video data. That is because these data have good energy compact effect after the coordinate transformation. A good energy compact effect represents that, most energy is compacted at lower frequency bands, and little energy exists at higher frequency bands. After quantization, only data at lower frequency bands have codes. Therefore, the data are compressed.

Discrete Cosine Transform (DCT) is a coordinate transformation from the time domain to the frequency domain. There are four basic types of DCT, which are DCT-I, DCT-II, DCT-III and DCT-IV. What follows is the expression of the four types.

DCT-I:

$$y(k) = \left(\frac{2}{N}\right)^{1/2} e(k) \sum_{n=0}^{N} e(n)x(n) \cdot \cos\left(\frac{nk\pi}{N}\right)$$

where n, k=0,1, ... , N.

DCT-II:

$$y(k) = \left(\frac{2}{N}\right)^{1/2} e(k) \sum_{n=0}^{N-1} x(n) \cdot \cos\left(\frac{(2n+1)k\pi}{2N}\right)$$

where n, k=0,1, ... , N−1.

DCT-III:

$$y(k) = \left(\frac{2}{N}\right)^{1/2} \sum_{n=0}^{N-1} e(n)x(n) \cdot \cos\left(\frac{(2k+1)n\pi}{2N}\right)$$

where n, k=0,1, ... , N−1.

DCT-IV:

$$y(k) = \left(\frac{2}{N}\right)^{1/2} \sum_{n=0}^{N-1} x(n) \cdot \cos\left(\frac{(2k+1)(2n+1)\pi}{4N}\right)$$

wheren n, k=0,1, ... , N−1.

In the above expressions, when n=0, $$e(n) = \frac{1}{\sqrt{2}},$$

else e(n)=1, and y(k) is an output from DCT and x(n) is an input to DCT. In practice, DCT-II is the most popular.

In the following statements, one-dimensional (1-D) DCT is first introduced for explaining two-dimensional (2-D) DCT.

Since the energy compact effect of DCT resembles to that of the Karhunen-Loe've transform, there are many researches about how to reduce computational complexity for 1-D DCT, for example, Lee's DCT algorithm. The Lee's DCT algorithm only needs 12 multiplication operations and 29 addition operations for 8-point 1-D DCT. In convention, the low-bound computational complexity of multiplication for N-point 1-D DCT is expressed as: $\mu(DCT_N)=2^{n+1}-n-2$; wherein $N=2^n$ and $\mu$ represents low-bound multiplication operations.

Therefore, the computational complexity for 8-point 1-D DCT of Lee's algorithm meets the requirement of the low-bound calculation quantity.

It is assumed that Y(k) is the result of x(n)'s DCT transformation, wherein k & n=0, 1, 2, ... N−1. The Forward DCT (FDCT) of x(n) can therefore be expressed as:

$$Y(k) = \frac{2}{N} e(k) \sum_{n=0}^{N-1} x(n)\cos\left[\frac{(2n+1)k\pi}{2N}\right] \quad (1)$$

,wherein when k=0, $$e(k) = \frac{1}{\sqrt{2}},$$

else e(k)=1.

This type of DCT is the so-called DCT-II type. The Inverse DCT (IDCT) of the DCT-II type is expressed as:

$$x(n) = \sum_{k=0}^{N-1} e(k)Y(k)\cos\left[\frac{(2n+1)k\pi}{2N}\right] \quad (2)$$

wherein when k=0, $$e(k) = \frac{1}{\sqrt{2}},$$

else e(k)=1.

Eq. (2) is also expressed as:

$$x(n) = \sum_{k=0}^{N-1} \hat{Y}(k)\cos\left[\frac{(2n+1)k\pi}{2N}\right] \quad (3)$$

wherein $\hat{Y}=e(k)Y(k)$

Based on odd k and even k, the following expression is obtained:

$$g(n) = \sum_{k=0}^{N/2-1} G(k)\cos\left[\frac{(2n+1)k\pi}{N}\right] \quad (4)$$

$$h(n) = \sum_{k=0}^{N/2-1} H(k)\cos\left[\frac{(2n+1)k\pi}{N}\right]$$

wherein $G(k)=\hat{Y}(2k), H(k)=\hat{Y}(2k+1)+\hat{Y}(2k-1), k=0, ... , N/2-1, \hat{Y}(-1)=0$ From the above description, x(n) can be expressed as:

$$x(n) = g(n) + \left(1/2\cos\left[\frac{(2n+1)\pi}{N}\right]\right) \cdot h(n) \quad (5)$$

$$x(N-n-1) = g(n) - \left(1/2\cos\left[\frac{(2n+1)\pi}{N}\right]\right) \cdot h(n)$$

$$n = 0, \ldots, n/2 - 1$$

It should be noticed that equations (2)~(5) come from IDCT. Because DCT is an orthogonal transform, the structure of FDCT is inversed from that of IDCT. The structure for 8-point 1-D DCT is shown in FIG. 1. In FIG. 1, X(0)~X(7) represent the input data, and y(0)~y(7) represent the output data. Herein, y(0)~y(7) are also called 1-D DCT outputs.

In image compression, it is usually to perform DCT on an image block with 8*8 pixels, and this kind of DCT transformation is usually a 2-D DCT transformation.

Here, another conventional 4*4 recursive 2-D DCT structure is taken as an example. Because this structure is a recursive one, its application can be extended to N*N 2-D DCT (N=2$^n$). 8*8 2-D DCT structure can also be deduced, which is as shown in FIG. 2. In FIG. 2, $x_{00}$, $x_{01}$, ... represent the input data, and y(m, n) (m, n=0~7) represent the 2-D DCT outputs. To realize this 2-D DCT structure, eight 1-D DCT structures are required. These 1-D DCT structures are the Lee's 1-D DCT structure. The outputs from 1-D DCT are represented by $a_i$ (i=0~63). For simplicity, only some of the $a_i$ values are shown in FIG. 2. However, the non-shown a, values can be easily deduced from the figure. The scanning orders (or zig-zag order) represent the frequency-scanning orders of 2-D DCT outputs of the image block with 8*8 pixels. The output at a lower frequency band has also a lower scanning order. The 2-D DCT operation of an image block with 8*8 pixels totally includes 96 multiplication operations, 466 addition operations and 49 shift operations.

Generally speaking, when an image block with 8*8 pixels is performed by a 2-D DCT and quantization operation, the high frequency coefficients are often 0. In coding, these coefficients having a value of 0 are not taken into calculation.

In real practice, in order to obtain desirable quality of the reconstructed image, more calculations are required. However, more calculations cause the reduction of throughput rate or the increase of hardware cost. Therefore, it is important to trade off the computational complexity against the reconstructed image quality.

In image data compression, coordinate transformation and quantization operations are usually combined.

FIG. 3a is a block diagram of a conventional method for coordinate transformation and quantization. Herein, the coordinate transformation usually directs to DCT, which is a coordinate transformation from time domain (time coordinate) to frequency domain (frequency coordinate). In this conventional method, all 2-D DCT coefficients of the image block are calculated and then quantized for obtaining quantized outputs. The 2-D DCT unit 310 calculates all 2-D DCT coefficients, whose structure is shown as FIG. 2. The quantization unit 320 quantizes these 2-D DCT coefficients. The method to perform quantization is well known; so the detail is not described here.

The above-mentioned conventional method can have the optimized quality of the reconstructed image. However, the conventional method needs a great number of operations.

The block diagram of another conventional method, referred as the second one is shown in FIG. 3b. The second conventional method, or so-called "fixed-point DCT method", includes a fixed-point 2-D DCT unit 330 and a quantization unit 340. As mentioned above, a quantized DCT coefficient at high frequency is usually 0. According to this characteristic, this conventional method only calculates a fixed amount of DCT coefficients. For example, to an image block with 8*8 pixels, only the first 32 DCT coefficients in the zig-zag scan order are selected due to the energy compact effect. The structure of the fixed-point 2-D DCT unit 330 is obtained by simplifying the structure in FIG. 2, for calculating only first 32 coefficients in the zig-zag scan order.

However, the second conventional method in FIG. 3b can not get enough reconstructed image quality on a complex image block. The high frequency coefficients of the complex image block should not be ignored. Because the high-frequency coefficients are ignored by the second conventional method, the reconstructed image quality is not good enough. That is to say, the second conventional method does not have adaptability between computational complexity and reconstructed image quality.

FIG. 3c shows another conventional method, referred as the third one, for reducing computational complexity of DCT, which is called a "recursive simplifying method". This conventional method can be applied in H.263 video compression standard. In this system, the relation between a quantization factor Q and the DCT coefficients is predicted for calculating whole 8*8 DCT coefficients or to calculate only 4*4 DCT coefficients.

In H.263 video compression standard, the quantization factor Q ranges from 1 to 31. In an image including several image blocks, different image blocks may have different quantization factor Q. The third conventional method calculates a relation between an end of block (EOB) and the quantization factor Q in advance. The relation between EOB and the quantization factor Q is shown in FIG. 4. The definition of EOB is stated as follows. Signals having higher scanning orders than the EOB become zero after quantization. Herein, EOB is also called quantization end point.

Taking a curve of 99% in FIG. 4 for example. If Q is 9, it indicates that 99% of EOB is smaller than 30. So, the relation between EOB and Q is obtained. When Q is larger, EOB moves ahead and vice versa. An image block with a larger Q value has a lower demand on reconstructed image quality.

Through the relationship between Q and EOB, a proper Q threshold value is obtained. The 8$^{th}$ or 9$^{th}$ position in the zig-zag scan is the middle value in zig-zag orders (1, 2, 3, 4, 5, 6, 7, 8, 9, 10, 12, 13, 14, 18, 19, 25) of an image block with 4*4 pixels. So, the zig-zag scan order 9 is the EOB for determining the Q threshold value. If the image block has a Q value larger than the Q threshold value, it is considered that the image block does not need high reconstructed image quality. In a low reconstructed image quality, the third conventional method calculates 8*8 DCT by using the 4*4 DCT unit 350 instead of the 8*8 DCT unit 360.

However, the 4*4 DCT unit 350 just performs approximate calculation but not real calculation. If an image block needs higher compression quality, the third conventional method utilities the 8*8 DCT unit 360 to calculate all 2-D DCT coefficients. The 2-D DCT coefficients, from 4*4 DCT 350 or 8*8 DCT 360, are quantized by the quantization unit 370 to obtain quantized outputs.

While the third conventional method is applied, if small EOB is used to obtain the large Q threshold value, higher computational complexity is required to get a higher reconstructed image quality. On the other hand, if large EOB is used to obtain a small Q threshold value, less computational complexity are required but a low reconstructed image quality is obtained.

SUMMARY OF THE INVENTION

It is therefore an object of the invention to provide an improved and simplified signal-processing device for having adaptability on reconstructed image quality and computational complexity and method therefor. The invention predicts a proper EOB and determines a simplified DCT structure by the EOB. The invention can archive lower computational complexity and less image quality distortion.

The invention achieves the above-identified objects by providing a new signal-processing method, for performing a DCT operation and a quantization operation on an input data to obtain quantized outputs. The input data includes an image block, and the image block corresponds to N (N is a natural number) DCT outputs and a search strategy. The N DCT outputs correspond to N scanning orders and N quantization parameters. The N scanning orders range from 0~N−1. The search strategy includes some scanning orders. The signal-processing method includes the following steps of: determining one of the scanning orders as an End of Block (EOB) of the image block based on the search strategy; calculating DCT outputs corresponding to the scanning orders lower than the EOB; and performing a quantization operation on the calculated DCT outputs for obtaining the quantized outputs.

Besides, the invention further discloses a signal-processing method for performing a coordinate transformation operation and a quantization operation on an input data to obtain quantization outputs. The input data corresponds to N (N is a natural number) coordinate transformation outputs and a search strategy, The N coordinate transformation outputs correspond to N scanning orders and N quantization parameters, and the N scanning orders range from 0~N−1. The search strategy includes part of the N scanning orders. In the signal-processing method, first of all, one of the scanning orders is considered as End of Block (EOB) of the input data based on the search strategy. Then the coordinate transformation outputs, corresponding to the scanning orders lower than the EOB, is calculated. Then, the quantization operation on the calculated coordinate transformation outputs is performed for obtaining the quantized outputs.

The input data are image block signals, multi-media signals, medical signals and the like. The coordinate transformation is a Discrete Cosine Transformation (DCT). The search strategy is an asymmetric binary search, a sequential search, a skip search and the like.

The procedure of determining EOB is stated as follows. (a) An initial value of an EOB parameter is selected as N−1. (b) A currently-used scanning order for a test operation is chosen based on the search strategy. (c) If the result of the test operation in step (b) is true, the currently-used scanning order is set as the EOB parameter; and if the currently-used scanning order is not an end condition of the search strategy, another scanning order is chosen as the currently-used scanning order based on the search strategy. (d) If the result of the test operation in step (b) is false; and the currently-used scanning order is not end condition of the search strategy, another scanning order is chosen as the currently-used scanning order based on the search strategy. (e) Above steps (b), (c) and (d) are repeated until the end condition of the search strategy is met. (f) The EOB parameter is set as EOB.

The test operation is stated as follows. The prediction value of a coordinate transformation output corresponding to the currently-used scanning order is obtained.

The prediction value is compared with the quantization parameter from the quantization table corresponding to the coordinate transformation output. The quantization parameter from the quantization table further corresponds to a quantization noise. When the prediction value is smaller than the quantization noise, the result of the test operation is true, and vice versa.

The invention further discloses a signal-processing device, for performing a Discrete Cosine Transform (DCT) operation and a quantization operation on input data to obtain quantizated outputs. The input data correspond to N (N is a natural number) DCT outputs, and the N DCT outputs corresponds to N frequency-scanning orders. The N scanning orders ranges from 0~N−1. The signal-processing device includes: a frequency-scanning unit, comprising part of the frequency-scanning orders and outputting one as the currently-used frequency-scanning order; a DCT unit, comprising plurality of one-dimensional (1-D) DCT outputs and N 2-D DCT outputs, the DCT unit outputting one of the 1-D DCT outputs responding to the currently-used frequency-scanning order; a quantization unit, comprising N quantization parameter, the quantization unit outputting the currently-used quantization parameter responding the first frequency-scanning order; and a frequency-domain adapting unit, obtaining a compare result based on the one 1-D DCT output and the currently-used quantization parameter; wherein the frequency-scanning unit selects one of the N frequency-scanning orders as an end-of-block (EOB) of the 2-D DCT outputs, the DCT unit calculates part of 2-D DCT outputs whose scanning orders are lower than the EOB, and the quantization unit quantizes the calculated 2-D DCT outputs to obtain the quantizated outputs.

The frequency-domain adapting unit further includes: a shift unit, receiving Q(m,n) and outputting Q(m,n)/16, wherein Q(m,n) is the currently-used quantization parameter; and a compare unit, comparing $|\alpha_{max}|$ with Q(m,n)/16 to output the comparison result; wherein $|\alpha_{max}|$ is an absolute value of a maximum 1-D DCT output corresponding to the currently-used frequency-scanning order, and when $|\alpha_{max}|$ is smaller than Q(m,n)/16, the comparison result is true, and vice versa.

The invention further discloses a signal-processing device, for performing a coordinate transformation operation and a quantization operation on input data to obtain quantizated outputs. The input data correspond to N (N is a natural number) coordinate transformation outputs, and the N coordinate transformation outputs correspond to N scanning orders. The N scanning orders range from 0~N−1. The signal-processing device includes: a scanning unit, comprising part of the scanning orders and outputting one scanning order as the currently-used scanning order; a coordinate transformation unit, comprising N coordinate transformation outputs and N prediction values, the coordinate transformation unit outputting a prediction value responding to the currently-used scanning order; a quantization unit, comprising N quantization parameters, and outputting the currently-used quantization parameter responding the currently-used scanning order; and a adapting unit, obtaining a comparison result based on the prediction value and the currently-used quantization parameter. The scanning unit selects one of the N scanning orders as an end-of-block (EOB) of the coordinate transformation outputs based on the compare result, the coordinate transformation unit calculates the coordinate transformation outputs whose scanning orders are lower than the EOB, and the quantization unit quantized the calculated coordinate transformation outputs to obtain the quantization output.

The adapting unit further includes: a shift unit, receiving the currently-used quantization parameter and outputting the currently-used quantization noise; and a compare unit, comparing the prediction value with the currently-used quantization noise to output the comparison result; when the prediction value is smaller than the currently-used quantization noise, the comparison result is true, and vice versa.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

According to a preferred embodiment of the invention, the computational complexity for DCT is reduced through the quantization noise analysis. The reconstructed image quality is deeply effected by the quantization parameter. As mentioned above, after an image block is processed by the DCT and quantization operation, most of the high frequency coefficients are 0. The relation between the predicted transformation values and the quantization table can be estimated so that the DCT structure can be simplified.

First, the method to predict EOB by analyzing the quantization noise is discussed.

Figure 1:
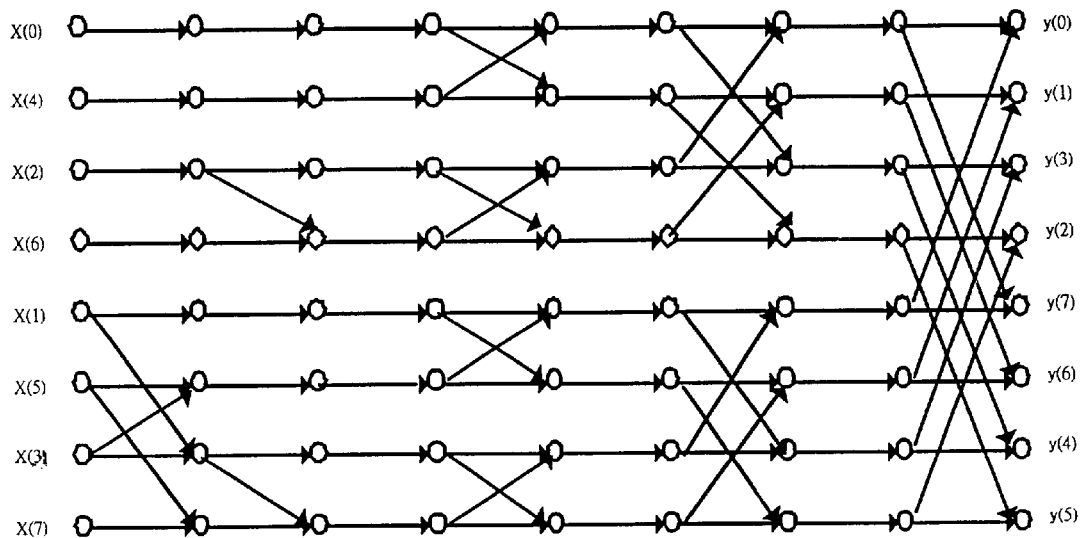
FIG. 1 is a conventional 1-D DCT structure diagram.
Figure 2:
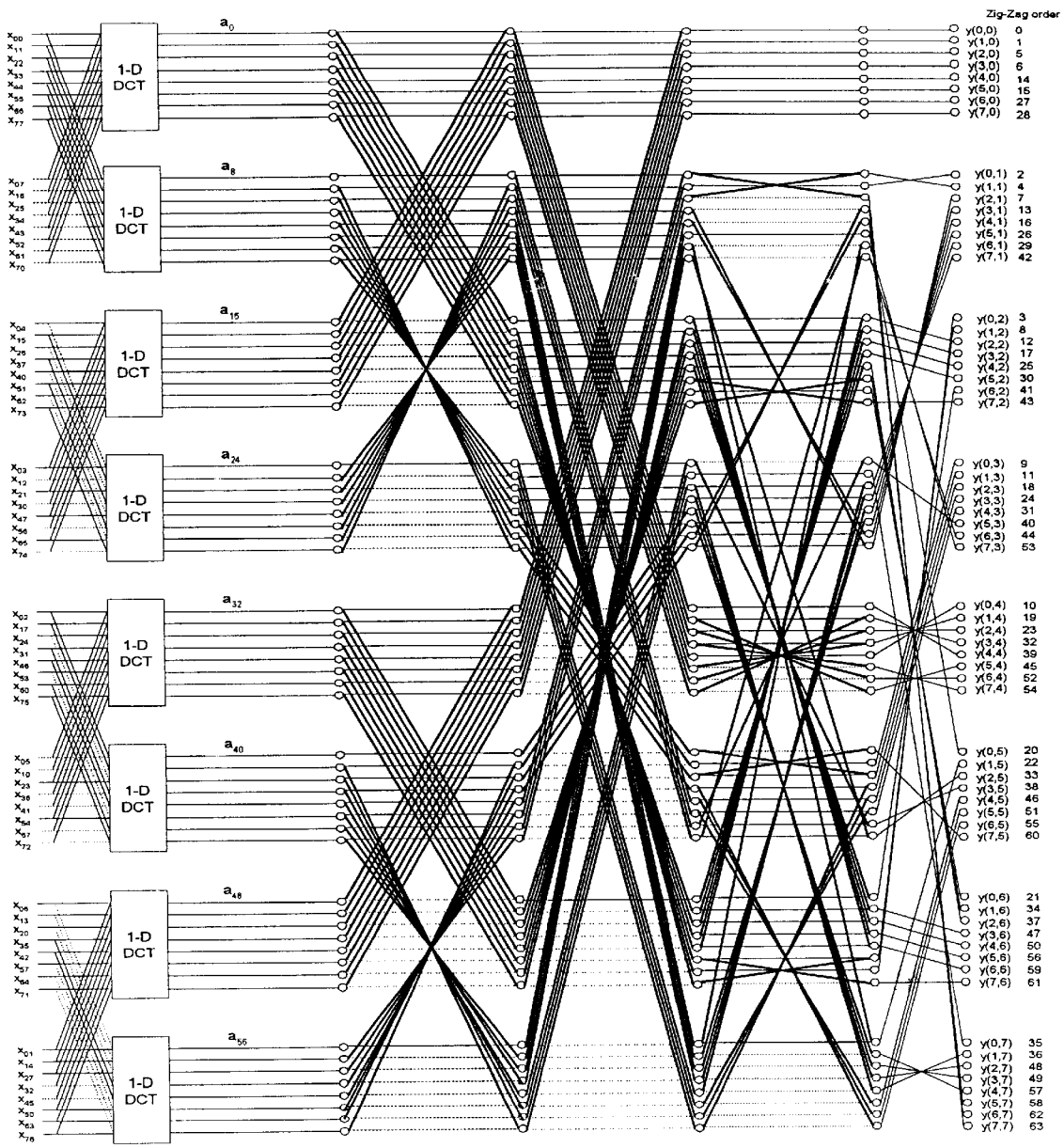
FIG. 2 is a conventional 2-D DCT structure diagram.
Figure 3A:
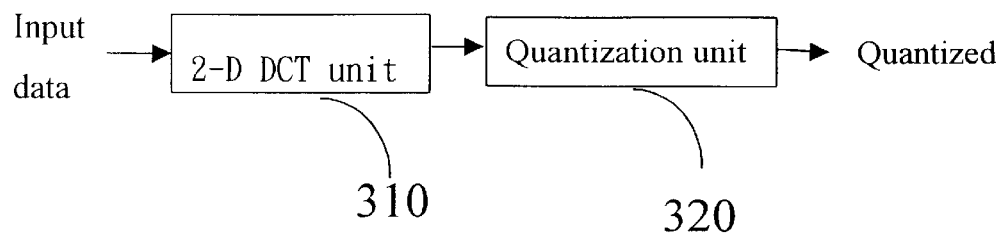
FIGS. 3a~3c respectively show block diagrams of three conventional systems for combining DCT and quantization operations.
Figure 3B:
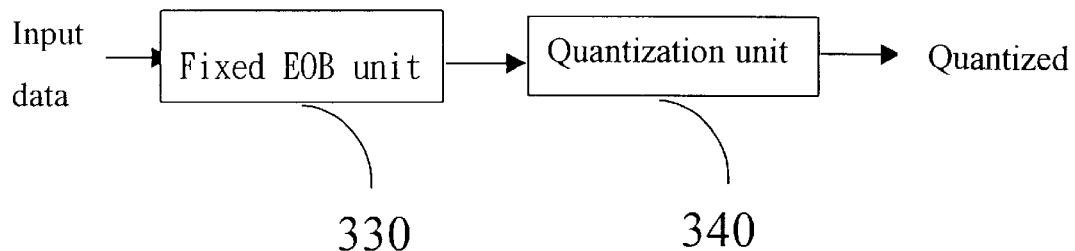
Figure 3C:
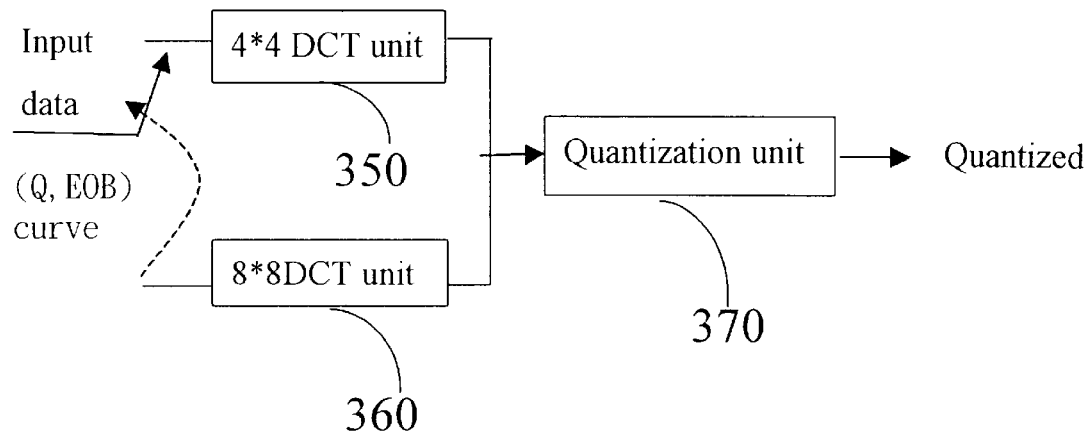
Figure 4:
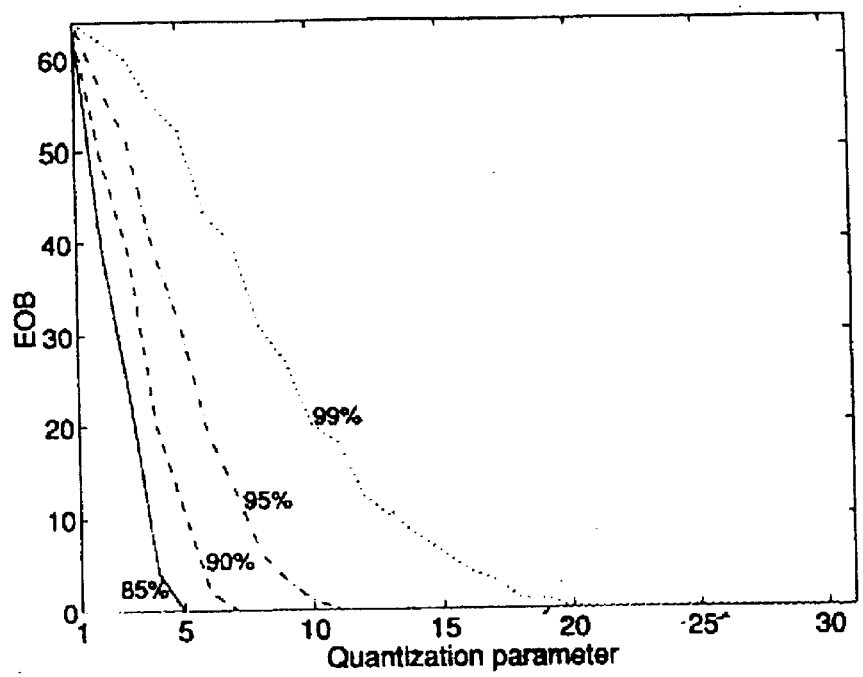
FIG. 4 shows relation curves between EOB and Q.

From FIG. 2, it is known that every 2-D DCT output y(m, n) (m, n=0~7) includes no more than eight 1-D DCT outputs $a_i$. A quantized output $y_q(m,n)$ is expressed as:

$$y_q(m, n) = \frac{y(m, n)}{Q(m, n)}$$

If the absolute quantized output $y_q(m,n)$ is smaller than 0.5, i.e., $|y_q(m,n)|<\frac{1}{2}$, the quantized output $y_q(m,n)$ is considered as 0, wherein $|y_q(m,n)|$ is an absolute value of the quantized output $y_q(m,n)$. On the other hand, it is supposed that $|\alpha_{max}|$, which is needed for obtaining the quantized output $y_q(m,n)$, is known, wherein $|\alpha_{max}|$ is larger than the other seven 1-D DCT outputs $|\alpha_i|$ required to generate a 2-D DCT output y(m, n); and $|\alpha_{max}|$, $|\alpha_i|$ are respectively absolute values of $a_{max}$ and $a_i$. Thus, the above expression can be rewritten as:

$$\frac{8 \cdot |a_{max}|}{Q(m, n)} < \frac{1}{2} \Rightarrow |a_{max}| < \frac{Q(m, n)}{16} \tag{6}$$

Therefore, when $|\alpha_{max}|$ is smaller than Q(m,n)/16, the quantization output $y_q(m,n)$ is considered as a quantization noise and can be ignored during DCT. Q(m,n) can be obtained by looking up from a quantization table. The quantization table is well known.

Next, according to the embodiment, it is found that a group of transformed values after quantization become zero as a base for reducing the computational complexity. In encoding an image block, the embodiment simplifies the computational complexity based on scanning orders. Table 1 shows frequency orders (zig-zag scan), the corresponding 2-D DCT outputs and $a_{max}$ for analyzing the quantization noise of an image block with 8*8 pixels.

TABLE 1

| Zig-zag0 | Zig-zag1 | Zig-zag5 | Zig-zag6 | Zig-zag14 | Zig-zag15 | Zig-zag27 | Zig-zag28 |
|---|---|---|---|---|---|---|---|
| y(0,0) | y(1,0) | y(2,0) | y(3,0) | y(4,0) | y(5,0) | y(6,0) | y(7,0) |
| a0 | a1 | a2 | a3 | a4 | a5 | a6 | a7 |
| Zig-zag2 | Zig-zag4 | Zig-zag7 | Zig-zag13 | Zig-zag16 | Zig-zag26 | Zig-zag29 | Zig-zag42 |
| y(0,1) | y(1,1) | y(2,1) | y(3,1) | y(4,1) | y(5,1) | y(6,1) | y(7,1) |
| a9 | a8 | a9 | a10 | a11 | a12 | a13 | a14 |
| Zig-zag3 | Zig-zag8 | Zig-zag12 | Zig-zag17 | Zig-zag25 | Zig-zag30 | Zig-zag41 | Zig-zag43 |
| y(0,2) | y(1,2) | y(2,2) | y(3,2) | y(4,2) | y(5,2) | y(6,2) | y(7,2) |
| a2 | a1 | a0 | a1 | a2 | a3 | a4 | a5 |
| Zig-zag9 | Zig-zag11 | Zig-zag18 | Zig-zag24 | Zig-zag31 | Zig-zag40 | Zig-zag44 | Zig-zag53 |
| y(0,3) | y(1,3) | y(2,3) | y(3,3) | y(4,3) | y(5,3) | y(6,3) | y(7,3) |
| a11 | a10 | a9 | a8 | a9 | a10 | a11 | a12 |
| Zig-zag10 | Zig-zag19 | Zig-zag23 | Zig-zag32 | Zig-zag39 | Zig-zag45 | Zig-zag52 | Zig-zag54 |
| y(0,4) | y(1,4) | y(2,4) | y(3,4) | y(4,4) | y(5,4) | y(6,4) | y(7,4) |
| a4 | a3 | a2 | a1 | a0 | a1 | a2 | a3 |
| Zig-zag20 | Zig-zag22 | Zig-zag33 | Zig-zag38 | Zig-zag46 | Zig-zag51 | Zig-zag55 | Zig-zag60 |
| y(0,5) | y(1,5) | y(2,5) | y(3,5) | y(4,5) | y(5,5) | y(6,5) | y(7,5) |
| a13 | a12 | a11 | a10 | a9 | a8 | a9 | a10 |
| Zig-zag21 | Zig-zag34 | Zig-zag37 | Zig-zag47 | Zig-zag50 | Zig-zag56 | Zig-zag59 | Zig-zag61 |
| y(0,6) | y(1,6) | y(2,6) | y(3,6) | y(4,6) | y(5,6) | y(6,6) | y(7,6) |
| a6 | a5 | a4 | a3 | a2 | a1 | a0 | a0 |
| Zig-zag35 | Zig-zag36 | Zig-zag48 | Zig-zag49 | Zig-zag57 | Zig-zag58 | Zig-zag62 | Zig-zag63 |
| y(0,7) | y(1,7) | y(2,7) | y(3,7) | y(4,7) | y(5,7) | y(6,7) | y(7,7) |
| a15 | a14 | a13 | a12 | a11 | a10 | a9 | a8 |

Figure 5:
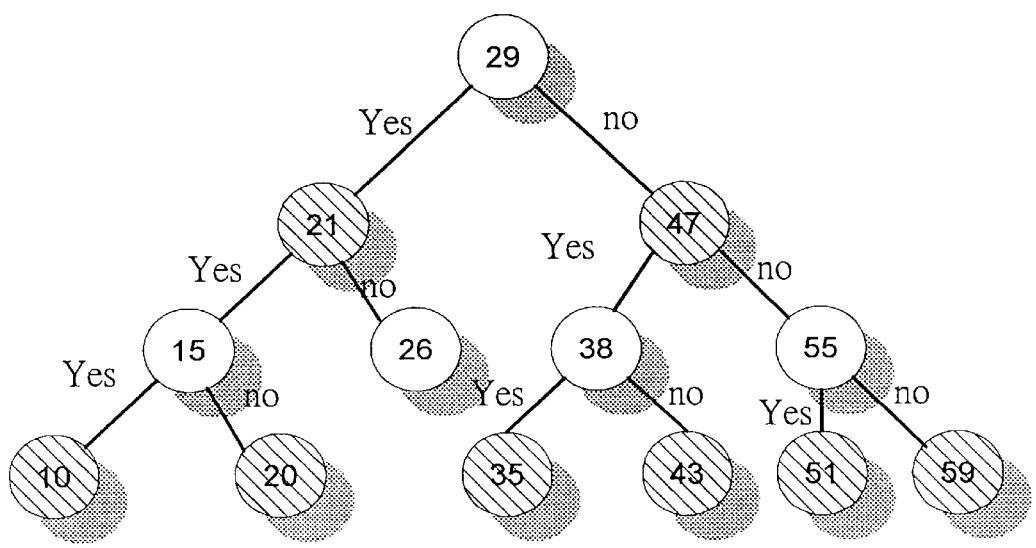
FIG. 5 shows a tree structure according to an embodiment of the invention.

Based on the relation between the quantization table and DCT outputs, a search strategy is selected to determine EOB based on characteristics of the image block. Herein an asymmetric binary search is used as the search strategy. FIG. 5 shows the structure for the asymmetric binary search. Referring to FIG. 5, a node is defined as a bottom node if it does not have any nodes lower than it. The bottom nodes are 10, 20, 26, 35, 43, 51 and 59.

Obviously, the search strategy is not limited to the asymmetric binary search. Other proper search strategy, such as sequential search strategy, skip search strategy and the like may be also applied. In the predicting principle for the search strategy, EOB in low-frequency order is preferred. The predicted EOB selected by the search strategy covers the real EOB of the image block so that the error can be reduced.

According to a preferred embodiment of the invention, some zig-zag orders are arranged in a layer (or tree) structure by the search strategy. In the layer structure, some nodes may be tested. When the test result is true, the next node to be tested is what has a scanning order lower than the testing node, and vice versa. The steps for predicting EOB by the embodiment are stated as follows.

(a) Setting an initial value of an EOB parameter I as N−1, wherein N−1 is the last one in all scanning orders. In FIG. 5, N=63.

(b) Choosing a currently-used scanning order to perform a test operation according to the search strategy. The test operation is, for example, eq. (6); and this currently-used scanning order is, for example, the node 29 in FIG. 5. The $|\alpha_{max}|$ and Q(m,n) for the node 29 are shown in table 1, and they are $a_{13}$ and Q(6,1). That is to say, for the node 29, the test operation is to compare $|\alpha_{13}|$ and Q(6,1)/16. If $|\alpha_{13}|$ is smaller than Q(6,1)/16, the test result is defined as true, and vice versa.

(c) When the test result is true, the currently-used scanning order is set as the EOB parameter I. When the currently-used scanning order or the search result is not an end condition of the search strategy, the search strategy selects another scanning order to replace the currently-used scanning order. The end condition is, for example, the bottom layer of the layer structure. In FIG. 5, the node 21 is the second scanning order. The EOB parameter I is set as 29.

(d) When the test result is false, and the currently-used scanning order is not an end condition of the search strategy, the search strategy selects another scanning order to replace the currently-used scanning order. In FIG. 5, when the test result for node 29 is false, the second scanning order is 47, and the EOB parameter I remains in its previous value.

(e) Repeating steps (b), (c) and (d) until the end condition.

(f) Setting the EOB parameter I as the EOB. For example, if the tested nodes are sequential 29, 21 and 26, and only node 29 is considered as a quantization noise, EOB is set as 29. It should be note while EOB is 63. EOB of 63 represents that the energy-compact effect of the tested image block is not apparent; therefore, all 2-D DCT calculation operation and quantization operation have to be performed in order to eliminate errors.

Figure 6A:
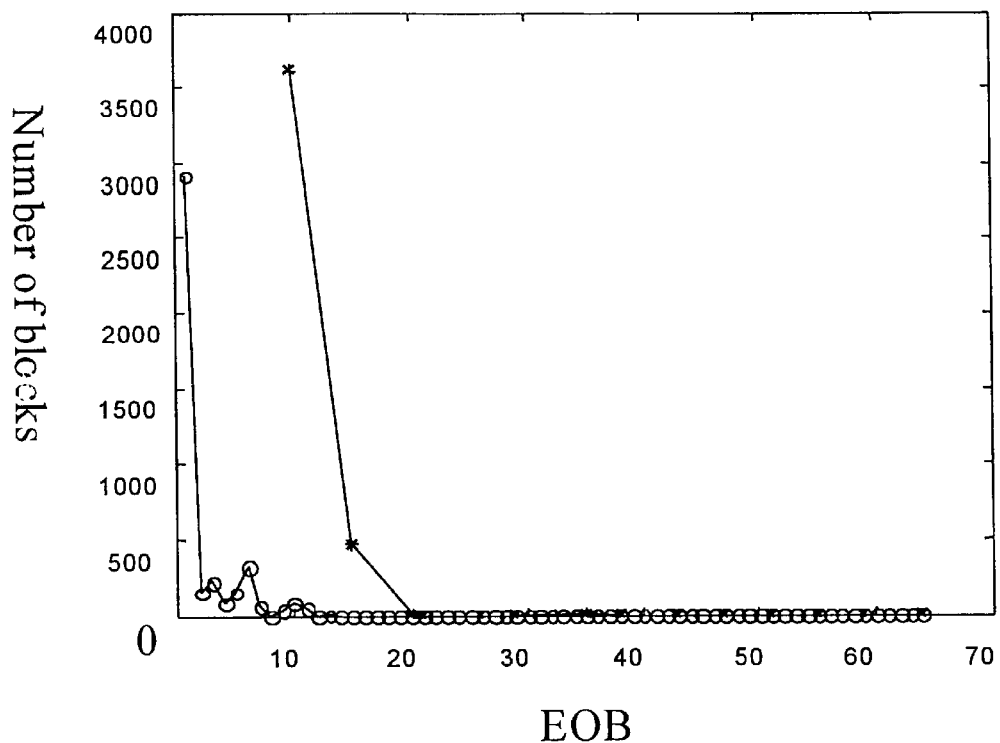
FIGS. 6a~6c compare real EOBs and the predicted EOB by the invention of one figure.
Figure 6B:
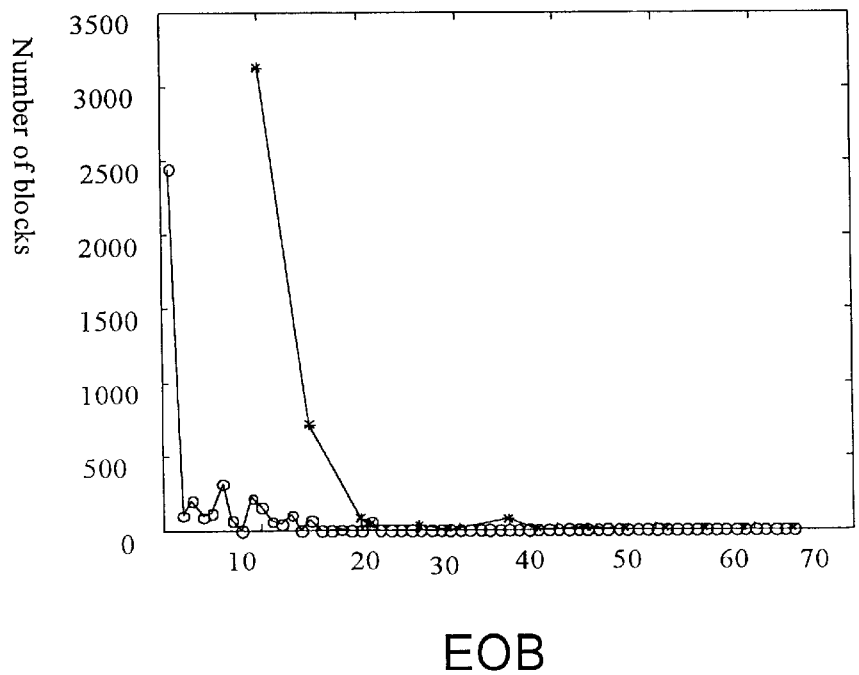
Figure 6C:
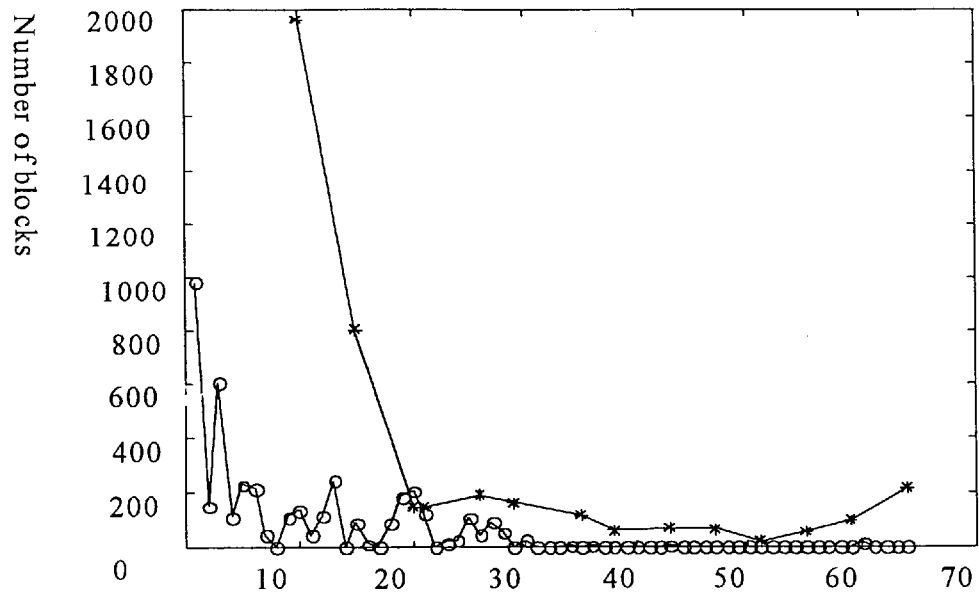
Figure 7A:
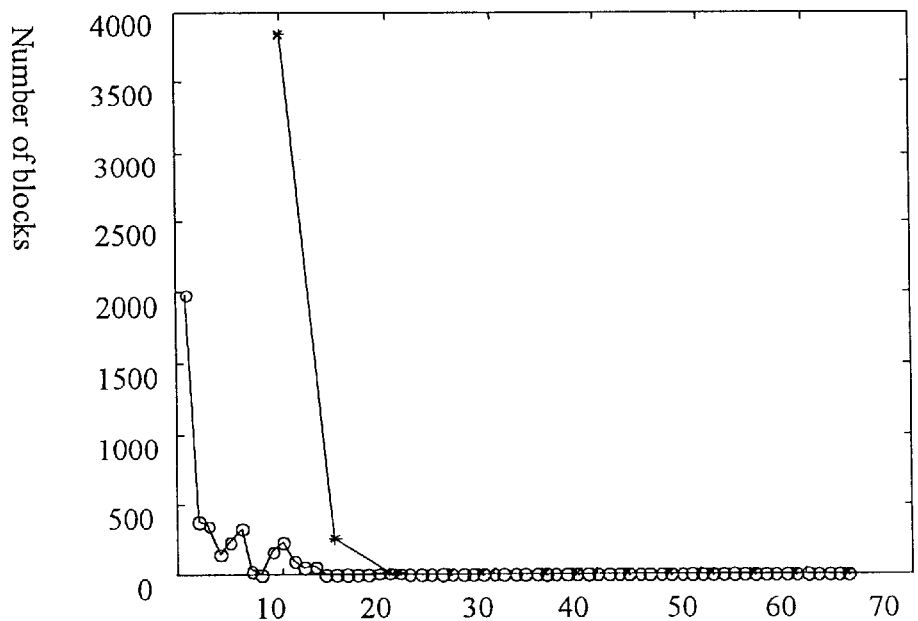
FIGS. 7a~7c compare real EOBs and the predicted EOB by the invention of another figure.
Figure 7B:
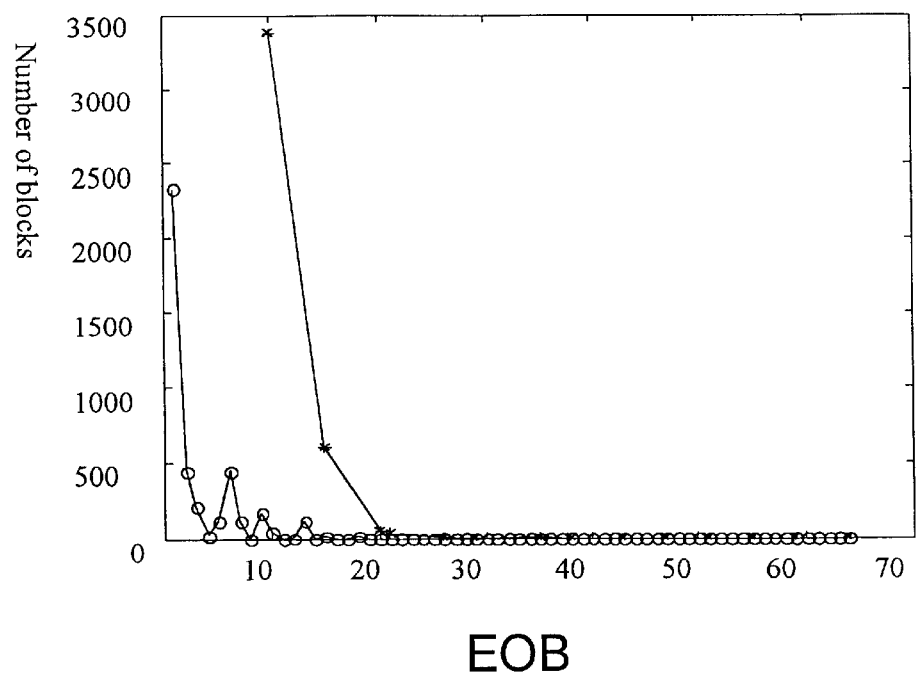
Figure 7C:
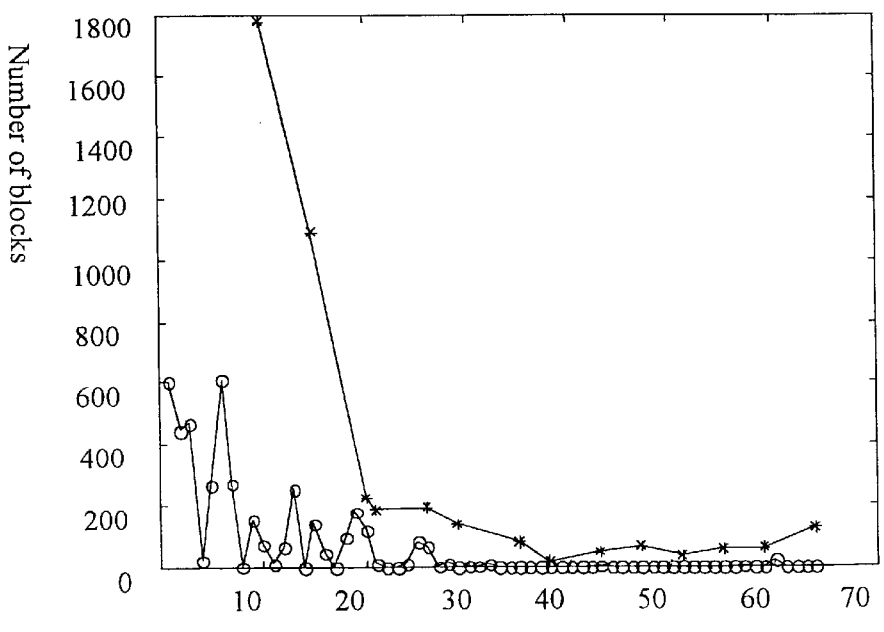
Figure 8A:
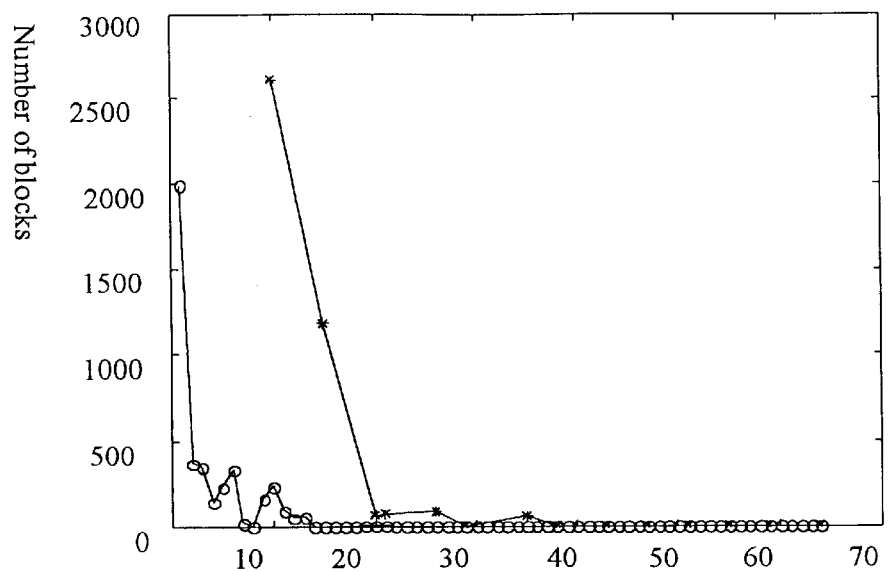
FIGS. 8a~8c compare real EOBs and the predicted EOB by the invention of still another figure.
Figure 8B:
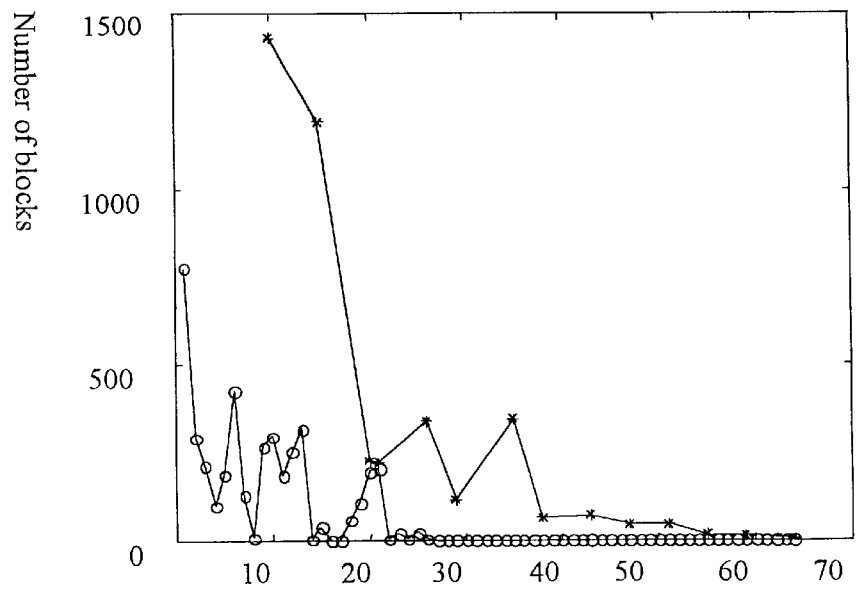
Figure 8C:
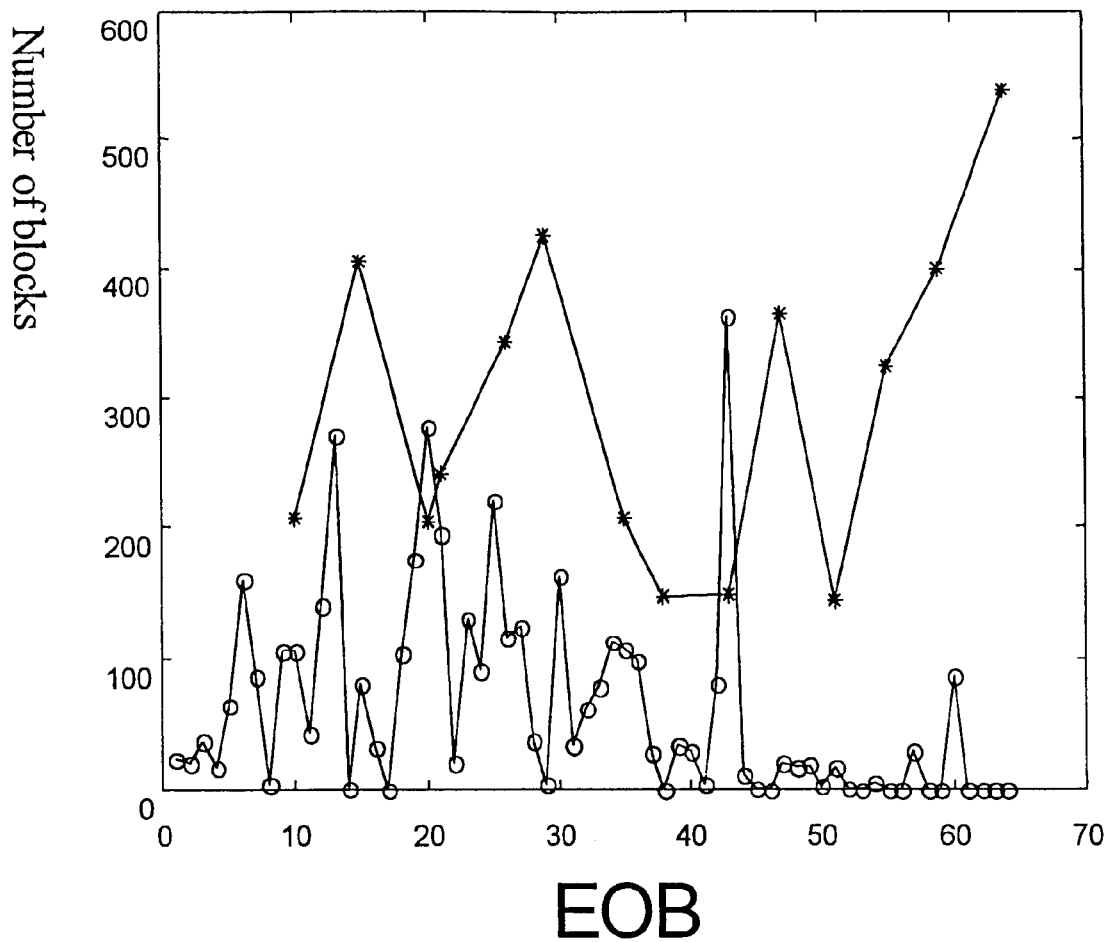

FIGS. 6a~6c, 7a~7c and 8a~8c respectively show the predicted EOB and real EOB of different pictures (F-16, Lena and baboon) based on different quantization parameter. In theses figures, circle symbols "O" represent the number of the blocks of EOB after all DCT and quantization operations; and star symbols "*" represent the number of the blocks of EOB predicted by the embodiment. FIGS. 6a, 7a and 8a are obtained based on Q=30. FIGS. 6b, 7b and 8b are obtained based on Q=60. FIGS. 6c, 7c and 8c are obtained based on Q=90. Herein, Q is the quality factor of which value indicates a quantization table.

Of the all pictures, the baboon pictures (FIGS. 8a~8c) are the most complicated and the other two (FIGS. 6a~6c and FIGS. 7a~7c) are less. Therefore, the EOB change of the baboon pictures is sharper. On the other hand, the EOB change of other two pictures with less content complexity is not apparent. Therefore, we have a conclusion that the higher the quantization parameter Q is, the sharper the EOB change is.

In low zig-zag scan orders, real EOB has complicated change. The predicted EOB by the search strategy of the embodiment can cover the complicated change of the real EOB. That is to say, the search strategy of the embodiment reduces the calculation complexity and does not effect the reconstructed image quality much. The search strategy of the embodiment has adaptability on computational complexity and reconstructed image quality.

Figure 9:
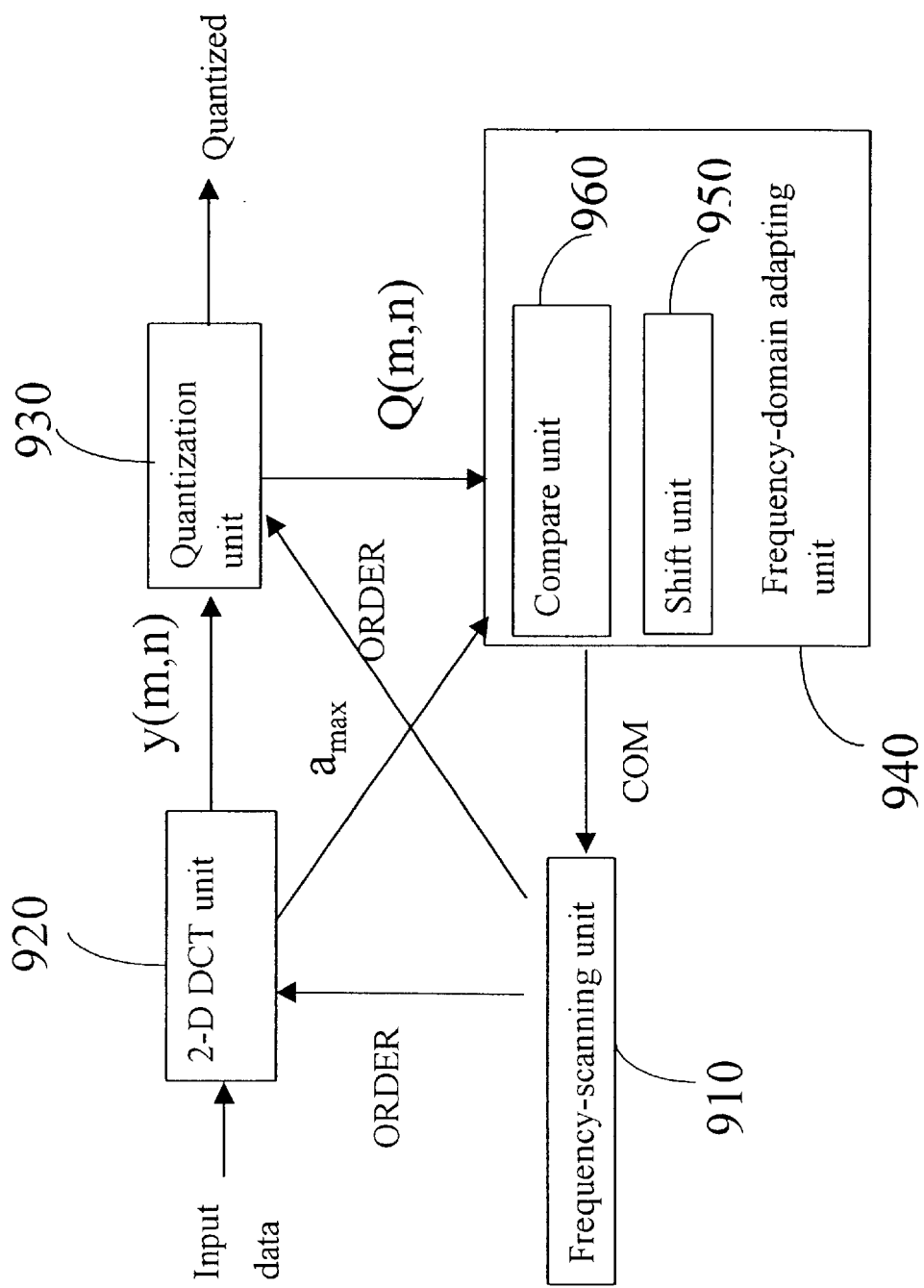
FIG. 9 shows a block diagram of the embodiment of the invention.

FIG. 9 shows a block diagram of the signal-processing device according to a preferred embodiment of the invention. Referring to FIG. 9, the signal-processing device includes: a frequency-scanning unit 910, a 2-D DCT unit 920, a quantization unit 930 and a frequency-domain adapting unit 940.

The frequency-scanning unit 910 includes some scanning orders and a search strategy based on the characteristic of the image block. Here, the asymmetric binary search is used as the search strategy. The 2-D DCT unit 920, for receiving an input data, is illustrated as FIG. 2. The quantization unit 930 includes quantization value Q(m,n). The frequency-domain-adapting unit 940 includes a shifting unit 950 and a compare unit 960.

The functions of these units are stated as follows. In the following description, the relation between the frequency scanning orders, 2-D DCT outputs and $a_{max}$ is like the above table 1.

The frequency-scanning unit 910 selects one of the frequency scanning orders in the layer structure as a frequency-scanning signal ORDER. For example, the frequency-scanning signal ORDER is the frequency-scanning order 29 in FIG. 5. The frequency-scanning unit 910 outputs the frequency-scanning signal ORDER respectively into the 2-D DCT unit 920 and the quantization unit 930 for performing a quantization noise test. The 2-D DCT unit 920 responses to the frequency-scanning signal ORDER to calculate and output a 1-D DCT output value $a_{max}$(a13). Here, the 1-D DCT transformation is Lee's 1-D DCT transformation.

The quantization unit 930 outputs a quantization value Q(6,1) for responding to this frequency-scanning signal ORDER. The shift unit 950 receives the quantization value Q(6,1) and shifts it as Q(6,1)/16. The comparing unit 960 compares $|\alpha_{13}|$ with Q(6,1)/16, and then outputs a compare result COM. When $|\alpha_{13}|$ is larger than Q(6,1)/16, the compare result COM is true, and vice versa. The compare result COM feeds back to the frequency-scanning unit 910.

Responding to the feed-backed compare result COM, the frequency-scanning unit 910 selects a next frequency-scanning order based on the search strategy. When the compare result COM is true, the frequency-scanning unit 910 selects the frequency-scanning order 21 as a new frequency-scanning signal ORDER. When the compare result COM is false, the frequency-scanning unit 910 selects the frequency-scanning order 47 as a new frequency-scanning signal ORDER. The frequency-scanning unit 910 again outputs the frequency-scanning signal ORDER into the 2-D DCT unit 920 and the quantization unit 930 for the next quantization noise test.

These units repeat the above operations until the predicted EOB of the image block is found. When the predicted EOB is found, the 2-D DCT unit 920 calculates all corresponding 1-D DCT outputs and 2-D DCT outputs which have lower frequency-scanning orders than the predicted EOB. The quantization unit 930 outputs quantized outputs by quantizing the 2-D DCT outputs.

Figure 10:
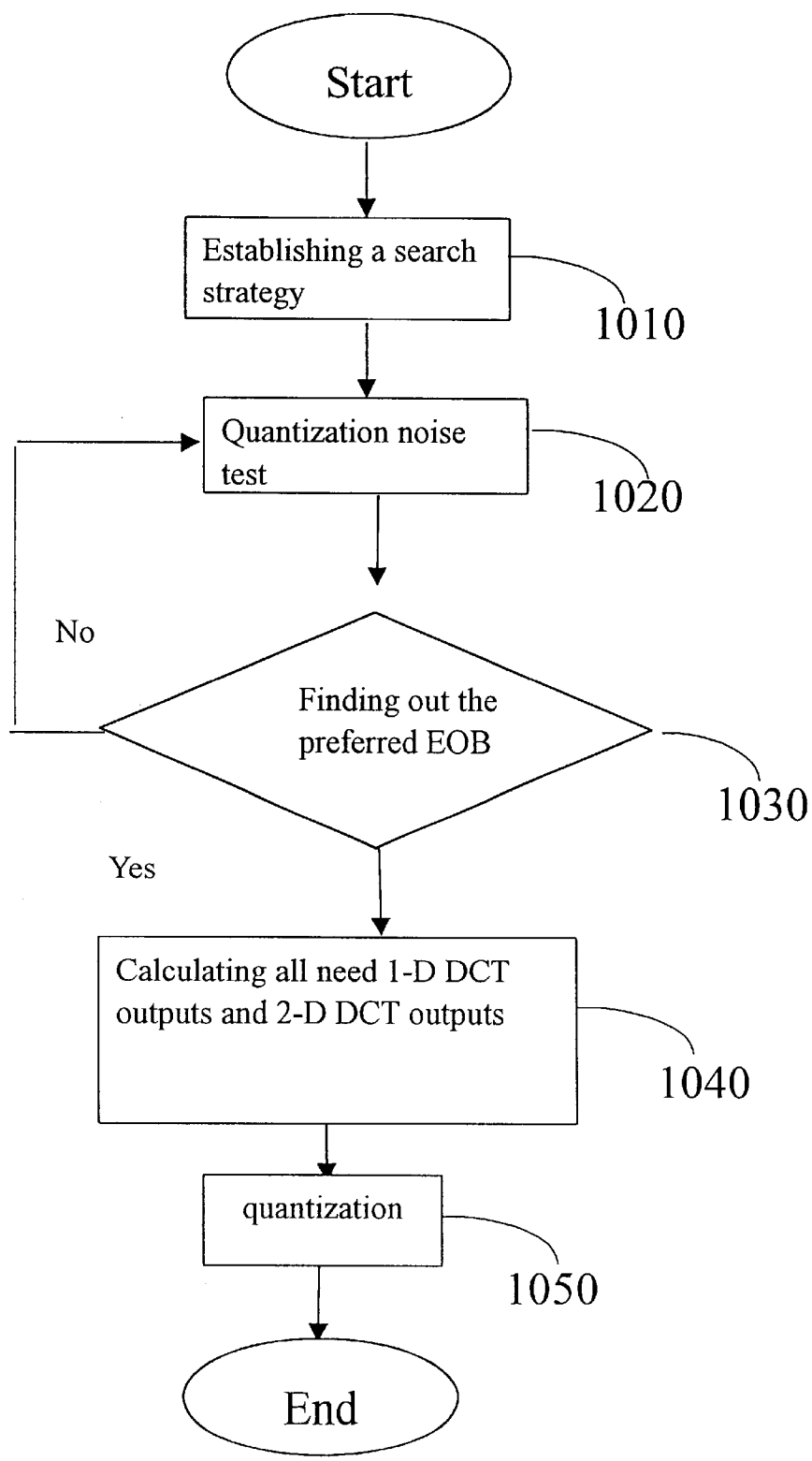
FIG. 10 shows a flow chart of the embodiment of the invention.

FIG. 10 shows a flow chart according to a preferred embodiment of the invention. In step 1010, a search strategy is established based on the characteristic of the input data. In the above description, the search strategy is the asymmetric binary search and the layer structure in FIG. 5.

Then, after the preferred EOB is found, all corresponding 1-D and 2-D DCT outputs having lower frequency-scanning order than the preferred EOB are calculated, as shown in step 1040.

The calculated 2-D DCT outputs are quantized for obtaining the quantized output, as shown in step 1050.

According to a preferred embodiment of the invention, several operations such as part of 1-D DCT transformation, part of 2-D DCT transformation and part of quantization operation in the DCT transformation and quantization operation can be excluded.

Tables 2~4 show the computational complexity, the reconstructed image quality and adaptability of pictures of F-16, Lena and baboon. In tables 2~4, a parameter Q is the quantization parameter in JPEG(Joint Photographic Experts Group). Q ranges from 5 to 95. Larger Q value cause better reconstructed image quality.

TABLE 2

Q = 30

| Figure | Method of calculating all DCT coefficients | | | Fixed EOB method | | | The invention | | |
|---|---|---|---|---|---|---|---|---|---|
| | F-16 | Lena | Baboon | F-16 | Lena | Baboon | F-16 | Lena | Baboon |
| Average addition amount | 466 | 466 | 466 | 417 | 417 | 417 | 372.83 | 365.97 | 376.71 |
| Extra addition amount | | | | | | | 11.74 | 14.48 | 11.52 |
| Average multiplication amount | 96 | 96 | 96 | 96 | 96 | 96 | 96 | 96 | 96 |
| Average division amount | 64 | 64 | 64 | 32 | 32 | 32 | 20.03 | 18.00 | 21.08 |

TABLE 3

Q = 60

| Figure | Method of calculating all DCT coefficients | | | Fixed EOB method | | | The invention | | |
|---|---|---|---|---|---|---|---|---|---|
| | F-16 | Lena | Baboon | F-16 | Lena | Baboon | F-16 | Lena | Baboon |
| Average addition amount | 466 | 466 | 466 | 417 | 417 | 417 | 384.32 | 376.13 | 402.65 |
| Extra addition amount | | | | | | | 11.67 | 11.68 | 11.24 |
| Average multiplication amount | 96 | 96 | 96 | 96 | 96 | 96 | 96 | 96 | 96 |
| Average division amount | 64 | 64 | 64 | 32 | 32 | 32 | 23.58 | 21.05 | 29.15 |

TABLE 4

Q = 90

| Figure | Method of calculating all DCT coefficients | | | Fixed EOB method | | | The invention | | |
|---|---|---|---|---|---|---|---|---|---|
| | F-16 | Lena | Baboon | F-16 | Lena | Baboon | F-16 | Lena | Baboon |
| Average addition amount | 466 | 466 | 466 | 417 | 417 | 417 | 413.75 | 411.04 | 443.91 |
| Extra addition amount | | | | | | | 11.63 | 11.38 | 11.43 |
| Average multiplication amount | 96 | 96 | 96 | 96 | 96 | 96 | 96 | 96 | 96 |
| Average division amount | 64 | 64 | 64 | 32 | 32 | 32 | 34.97 | 33.47 | 47.79 |

Then, a frequency-scanning order is selected for a quantization noise test, as shown in step 1020. In the above description, the quantization noise test is performed by eq.(6).

Then, in step 1030, whether the current frequency-scanning order is the preferred EOB is judged. If the judge result is "yes", step 1040 is performed. If the result is not, a new frequency-scanning order is selected based on the search strategy and step 1020 is repeated.

From tables 2~4, it is known that the invention has adaptability on reconstructed image quality and computational complexity. For a complicated image, the quantization coefficient of the high frequency should not be ignored if a better reconstructed image quality is needed. The fixed EOB method ignores the high frequency coefficients, so the reconstructed image quality for the complicated image is not well enough. The invention keeps the high-frequency coefficients as possible by layer structure and prediction. That is to say, the DCT result of the invention approximates the real DCT to some degree. The invention can obtain enough quantized outputs and reduce the computational complexity without lowering the reconstructed image quality.

The comparison between the invention and the conventional methods is shown in the following table 5.

From the comparison result, it is known that the invention has some adaptability on complicated image block. The invention performs a better reconstructed image quality and a lower calculation complexity by making the predicted EOB approach real EOB.

TABLE 5

|  | Complexity | Quality | Adaptability |
|---|---|---|---|
| Method for calculating all DCT coefficients | High | High | No |
| Fixed EOB method | Medium | Medium | No |
| Recursive simplifying method | Low | Medium | Medium |
| The invention | Low | Good | High |

The invention predicts a preferred EOB of the image block in frequency-domain. The invention simplifies its DCT structure based on the predicted EOB. Compared with the conventional methods, the invention has more adaptability on reconstructed image quality and computational complexity.

Therefore, one characteristic of the invention is to simplify and adapt a proper DCT structure by the quantization noise test. The invention has adaptability on the image block, and does not have to analyze the characteristic of the input data in advance.

The coordinate transformation of the invention is not limited to DCT transformation. Other suitable coordinate transform may be applied in the invention, for example, the Fourier transform, the wavelet transform and the like.

In coordinate transformation, the coordinate-transformation output is estimated to obtain a prediction value. For example, in the above DCT, the prediction value is $|\alpha_{max}|$. Then, the predicted transformation and the corresponding quantization parameter from the quantization table are compared to obtain a compare result. For example, in the above DCT transform, $|\alpha_{max}|$ is compared with $Q(m,n)/16$.

Besides, the invention is not limited to the image block with 8*8 pixels, and image blocks of other size can be applied in the invention. Even, the input data of the invention further includes multi-media signals, medical signals or the like signals.

In the scope and spirit of the invention, the invention can perform a prediction on a part of 2-D DCT outputs to simplify the whole calculation structure. Even, the invention properly selects some scanning orders based on the physical characteristic of the image block. How to determined the required transformation coefficients is based on the prediction result on these scanning orders. In certain cases, the image is even completely abandoned if a less reconstructed image quality is required.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal-processing method, for performing a Discrete Cosine Transform (DCT) operation and a quantization operation on an input data to obtain quantized outputs, the input data comprising an image block, the image block corresponding to N (N is a natural number) DCT outputs and a search strategy, the N DCT outputs corresponding to N scanning orders and N quantization parameters, the N scanning orders ranging from 0~N−1, the search strategy comprising part of the N scanning orders, the signal-processing method comprising:

determining one of the scanning orders as an End of Block (EOB) of the image block based on the search strategy;

calculating DCT outputs corresponding to the scanning orders lower than the EOB; and performing a quantization operation on the calculated DCT outputs for obtaining the quantized outputs.

2. A signal-processing method according to claim 1, wherein the search strategy is an asymmetric binary search.

3. A signal-processing method according to claim 2, wherein the step of determining EOB comprises:

(a) setting an initial value of an EOB parameter as N−1;

(b) choosing a currently-used scanning order for a test operation based on the search strategy;

(c) when the result of the test operation in said step (b) is true, setting this scanning order as the EOB parameter; and when the first scanning order is not an end condition of the search strategy, choosing another scanning order to be the currently-used scanning order based on the search strategy;

(d) when the result of the test operation in said step (b) is false; and the currently-used scanning order is not an end condition of the search strategy, choosing another scanning order as the currently-used scanning order based on the search strategy;

(e) repeating said steps (b), (c) and (d) until the end condition of the search strategy; and (f) setting the BOB parameter as EOB.

4. A signal-processing method according to claim 3, wherein the test operation compares $|\alpha_{max}|$ with $Q(m,n)/16$, wherein $|\alpha_{max}|$ is an absolute value corresponding to the currently-used scanning order, and $Q(m,n)/1\ 6$ is a quantization parameter divided by 16.

5. A signal-processing method according to claim 4, wherein when $|\alpha_{max}|$ is smaller than $Q(m,n)/16$, the test operation result is true, and another scanning order lower than the currently-used scanning order is applied; and when $|\alpha_{max}|$ is larger than or equal to $Q(m,n)/16$, the test operation result is false, and another scanning order higher than the first scanning order is applied.

6. A signal-processing method, for performing a coordinate transformation operation and a quantization operation on an input data to obtain quantized outputs, the input data corresponding to N (N is a natural number) coordinate transformation outputs and a search strategy, the N coordinate transformation outputs corresponding to N scanning orders and N quantization parameters, the N scanning orders ranging from 0~N−1, the search strategy comprising part of the N scanning orders, the signal-processing method comprising:

determining one of the scanning orders as an End of Block (EOB) of the input data based on the search strategy;

calculating coordinate transformation outputs corresponding to the scanning orders lower than the EOB; and performing a quantization operation on the calculated coordinate transformation outputs for obtaining quantized outputs.

7. A signal-processing method according to claim 6, wherein the input data comprise image blocks.

8. A signal-processing method according to claim 6, wherein the input data are multi-media signals.

9. A signal-processing method according to claim 6, wherein the input data are medical signals.

10. A signal-processing method according to claim 6, wherein the coordinate transformation is a Discrete Cosine Transformation (DCT).

11. A signal-processing method according to claim 6, wherein the search strategy is an asymmetric binary search.

12. A signal-processing method according to claim 6, wherein the search strategy is a sequential search.

13. A signal-processing method according to claim 6, wherein the search strategy is a skip search.

14. A signal-processing method according to claim 6, wherein the step of determining EOB comprises:
   (a) setting an initial value of an EOB parameter as N−1;
   (b) choosing a currently-used scanning order for a test operation based on the search strategy;
   (c) when the result of the test operation in step (b) is true, setting the currently-used scanning order as the EOB parameter; and when the currently-used scanning order is not an end condition of the search strategy, choosing another scanning order as the currently-used scanning order based on the search strategy;
   (d) when the result of the test operation in step (b) is false; and the currently-used scanning order is not an end condition of the search strategy, choosing another scanning order as the currently-used scanning order based on the search strategy;
   (e) repeating the above steps (b), (c) and (d) until the end condition of the search strategy; and
   (f) setting the EOB parameter as EOB.

15. A signal-processing method according to claim 14, wherein the test operation comprises:
   getting a prediction value of a coordinate transformation output corresponding to a currently-used scanning order; and
   comparing the prediction value with a quantization parameter corresponding to the coordinate transformation output.

16. A signal-processing method according to claim 15, wherein the quantization parameter further corresponds to a quantization noise.

17. A signal-processing method according to claim 14, wherein when the absolute prediction value is smaller than the quantization noise, the result of the test operation is true, and vice versa.

18. A signal-processing device, for performing a Discrete Cosine Transform (DCT) operation and a quantization operation on an input data to obtain quantized outputs, the input data corresponding to N (N is a natural number) DCT outputs, the N DCT outputs corresponding to N frequency-scanning orders, the N scanning orders ranging from 0~N−1, the signal-processing device comprising:
   a frequency-scanning unit, comprising part of the frequency scanning orders, the frequency-scanning unit outputting one as a currently-used frequency-scanning order;
   a DCT unit, comprising plurality of one-dimensional (1-D) DCT outputs and N 2-D DCT outputs, the DCT unit outputting one of the 1-D DCT outputs responding to the currently-used frequency-scanning order;
   a quantization unit, comprising N quantization parameters, the quantization unit outputting a currently-used quantization parameter responding to the currently-used frequency-scanning order; and
   a frequency-domain adapting unit, obtaining a compare result based on the one 1-D DCT output and the quantization parameter;
   wherein the frequency-scanning unit selects one of the N frequency-scanning orders as an end-of-block (EOB) of the 2-D DCT outputs, the DCT unit calculates part of 2-D DCT outputs whose scanning orders are lower than the EOB, and the quantization unit quantized the calculated 2-D DCT outputs to obtain the quantized outputs.

19. A signal-processing method according to claim 18, wherein the frequency-domain adapting unit further comprises:
   a shift unit, receiving Q(m, n) and outputting Q(m,n)/16, wherein Q(m,n) is the quantization parameter; and
   a compare unit, comparing $|\alpha_{max}|$ with Q(m,n)/16 to output the comparison result;
   wherein $|\alpha_{max}|$ is an absolute value of the maximum 1-D DCT output corresponding to the currently-used frequency-scanning order, and when $|\alpha_{max}|$ is smaller than Q(m,n)/16, the comparison result is true, and vice versa.

20. A signal-processing device, for performing a coordinate transformation operation and a quantization operation on an input data to obtain quantized outputs, the input data corresponding to N (N is a natural number) coordinate transformation outputs, the N coordinate transformation outputs corresponding to N scanning orders, the N scanning orders ranging from 0N−1, the signal-processing device comprising:
   a scanning unit, comprising part of the scanning orders, the scanning unit outputting one scanning order as a currently-used scanning order;
   a coordinate transformation unit, comprising N coordinate transformation outputs and N prediction values, the coordinate transformation unit outputting a prediction value responding to the currently-used scanning order;
   a quantization unit, comprising N quantization parameters, the quantization unit outputting a quantization parameter responding the currently-used scanning order; and
   an adapting unit, obtaining a comparison result based on the prediction value and the quantization parameter;
   wherein the scanning unit selects one of the N scanning orders as an end-of-block (EOB) of the coordinate transformation outputs based on the comparison result, the coordinate transformation unit calculates the coordinate transformation outputs whose scanning orders are lower than the EOB, and the quantization unit quantizes the calculated coordinate transformation outputs to obtain the quantization outputs.

21. A signal-processing method according to claim 20, wherein the adapting unit further comprises:
   a shift unit, receiving the quantization parameter and outputting a value of the quantization noise; and
   a compare unit, comparing the prediction value with the quantization noise to output the comparison result; when the prediction value is smaller than the quantization noise, the comparison result is true, and vice versa.

* * * * *